United States Patent
Reynolds et al.

(10) Patent No.: US 10,429,844 B2
(45) Date of Patent: Oct. 1, 2019

(54) SYSTEMS AND METHODS FOR PROVIDING A VERTICAL PROFILE FOR AN IN-TRAIL PROCEDURE

(75) Inventors: Zachary R. Reynolds, Peoria, AZ (US); Cyro A. Stone, Peoria, AZ (US); Nicholas R. Hoffman, Cave Creek, AZ (US)

(73) Assignee: AVIATION COMMUNICATION & SURVEILLANCE SYSTEMS LLC, Phoenix, AZ (US)

( * ) Notice: Subject to any disclaimer, the term of this patent is extended or adjusted under 35 U.S.C. 154(b) by 160 days.

(21) Appl. No.: 13/098,324

(22) Filed: Apr. 29, 2011

(65) Prior Publication Data

US 2011/0270473 A1    Nov. 3, 2011

Related U.S. Application Data

(60) Provisional application No. 61/329,302, filed on Apr. 29, 2010.

(51) Int. Cl.
*G05D 1/02* (2006.01)
*G08G 5/00* (2006.01)
*G05D 1/08* (2006.01)

(52) U.S. Cl.
CPC .......... *G05D 1/0204* (2013.01); *G05D 1/0816* (2013.01); *G08G 5/0021* (2013.01); *G08G 5/0052* (2013.01); *G08G 5/0078* (2013.01); *G08G 5/0008* (2013.01); *G08G 5/0091* (2013.01)

(58) Field of Classification Search
CPC ... G08G 5/0021; G08G 5/0052; G08G 5/0078
USPC ...... 340/945, 961, 970; 342/26, 38; 701/121
See application file for complete search history.

(56) References Cited

U.S. PATENT DOCUMENTS

| | | | |
|---|---|---|---|
| 7,570,178 B1 * | 8/2009 | Whalen et al. | 340/961 |
| 2002/0008640 A1 * | 1/2002 | Horvath | G01S 1/047 340/945 |
| 2006/0030994 A1 * | 2/2006 | Lai | G08G 5/0008 701/102 |
| 2011/0187588 A1 * | 8/2011 | Khatwa et al. | 342/26 B |

OTHER PUBLICATIONS

Murdoch J. Enhanced Oceanic Operations Human-In-The-Loop In-Trail Procedure Validation Simulation Study (Jun. 2008).*
Murdoch, Jennifer L., "Enhanced Oceanic Operations Human-in-the-Loop In-Trail Procedure Validation Simulation Study", NASA/TP-2008-215313, Jun. 2008, NASA, Hampton, Virginia.

* cited by examiner

*Primary Examiner* — Charles J Han
(74) *Attorney, Agent, or Firm* — Dickinson Wright PLLC

(57) ABSTRACT

Various methods can, for example, depict information for use by a pilot or other individual in an aircraft. In an exemplary embodiment, the method may include providing, in a hardware display, a graphical vertical profile displaying an aircraft to the pilot of the aircraft. This method may further include providing, in the vertical profile, an indication of the relative speed of at least one other aircraft and a graphical indication of a clearance window for vertical maneuvers for the aircraft of the pilot. Further embodiments of the present invention concern systems and software for implementing the related method embodiments of the present invention.

23 Claims, 4 Drawing Sheets

SYSTEMS AND METHODS FOR PROVIDING A VERTICAL PROFILE FOR AN IN-TRAIL PROCEDURE

CROSS REFERENCE TO RELATED APPLICATIONS

This application is related to and claims the priority of U.S. Provisional Patent Application No. 61/329,302, filed Apr. 29, 2010, the entirety of which is hereby incorporated herein by reference.

BACKGROUND

Field

A vertical profile for an in-trail procedure can provide a pilot with enhanced situational awareness. Such a vertical profile may be able to provide a graphical indication of a clearance window for change in altitude procedures, as well as the underlying bases for such a window.

Description of the Related Art

Under certain circumstances, particularly for travel over large distances, pilots prefer to fly at higher altitudes. Flying at higher altitudes may, for a variety of reasons, improve fuel efficiency or increase safety in travel. Many aircraft, however, use the same path. Moreover, for safety reasons, it may be important for aircraft to avoid close proximity to other aircraft.

Automatic Dependent Surveillance-Broadcast (ADS-B) systems that employ an In-Trail Procedure (ITP), typically make predictions of whether or not ITP changes in elevation are allowable.

In certain systems, a pilot enters a desired flight level. Then, the surveillance system determines whether or not blockage exists for this maneuver when assessing neighboring aircraft telemetry compared to criteria, such as separation being above fifteen nautical miles and speed difference being less than 20 knots.

SUMMARY

According to certain embodiments, a method includes providing, in a hardware display, a graphical vertical profile displaying an aircraft to a pilot of the aircraft. The method also includes providing, in the vertical profile, an indication of the relative speed of at least one other aircraft and a graphical indication of a clearance window for vertical maneuvers for the aircraft of the pilot.

In certain embodiments, a computer readable medium is encoded with instructions that, when executed in hardware, perform a process. The process includes providing, in a hardware display, a graphical vertical profile displaying an aircraft to a pilot of the aircraft. The process also includes providing, in the vertical profile, an indication of the relative speed of at least one other aircraft and a graphical indication of a clearance window for vertical maneuvers for the aircraft of the pilot.

A system, in certain embodiments, includes at least one processor and at least one memory encoded with computer instructions. The at least one processor and at least one memory are configured to cause the system at least to provide, in a hardware display, a graphical vertical profile displaying an aircraft to a pilot of the aircraft. The at least one processor and at least one memory are also configured to cause the system at least to provide, in the vertical profile, an indication of the relative speed of at least one other aircraft and a graphical indication of a clearance window for vertical maneuvers for the aircraft of the pilot.

BRIEF DESCRIPTION OF THE DRAWINGS

For proper understanding of the invention, reference should be made to the accompanying drawings, wherein.

DETAILED DESCRIPTION OF THE PREFERRED EMBODIMENT(S)

There are various ways that in-trail procedures, and particularly changes in elevation, can be displayed to pilots. Textual display of potential tradeoffs which the flight crew may be considering can be provided to allow adjustments for attaining the desired flight levels based on various criteria.

For example, in certain systems, the criteria for initiating the maneuver and the standard flight level change criteria (constant Mach; climb/descent rate minimum) are designed such that the ITP Aircraft and Reference Aircraft avoid getting closer than the ITP Separation Minimum. An ITP may only be initiated when two conditions are met: a minimum ITP Distance exists and a maximum Positive Ground Speed Differential between the ITP Aircraft and the Reference Aircraft exists.

The ITP Speed/Distance Criteria that can be used to support a 10 NM separation minimum may be as follows: initiation ITP Distance greater than or equal to 15 NM and a Positive Ground Speed Differential of less than or equal to 20 kts.

While textual display shows the information of current spacing and current ground speed differentials, a vertical profile can provide a more intuitive interface and can aid pilots in making correct determinations of safety with respect to vertical procedures.

Depictions of vertical/flight level assessments of blockage/non-blockage can be provided. Thus, a vertical profile region of concern could be depicted to indicate a blockage or clearance region. For example, FIGS. 1A and 1B illustrate an embodiment of a vertical profile in accordance with certain embodiments of the present invention.

Figure 1A:
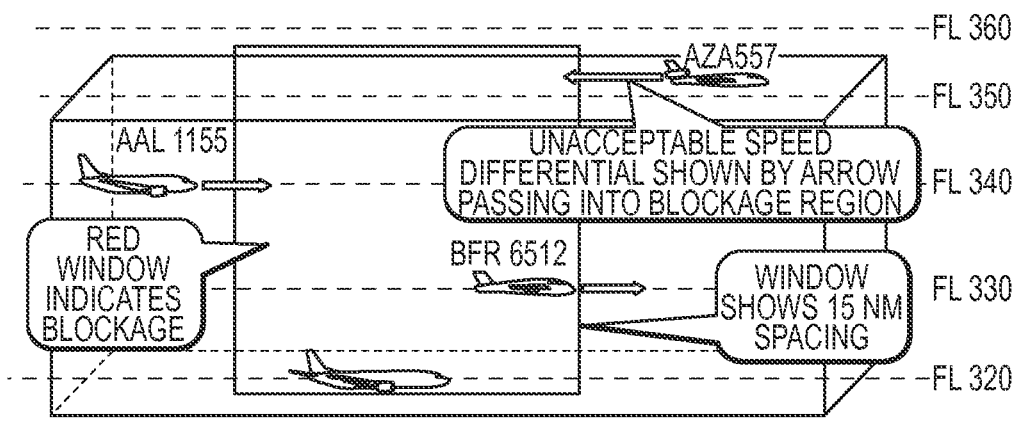
FIGS. 1A and 1B illustrate an embodiment of a vertical profile in accordance with certain embodiments of the present invention.
Figure 1B:
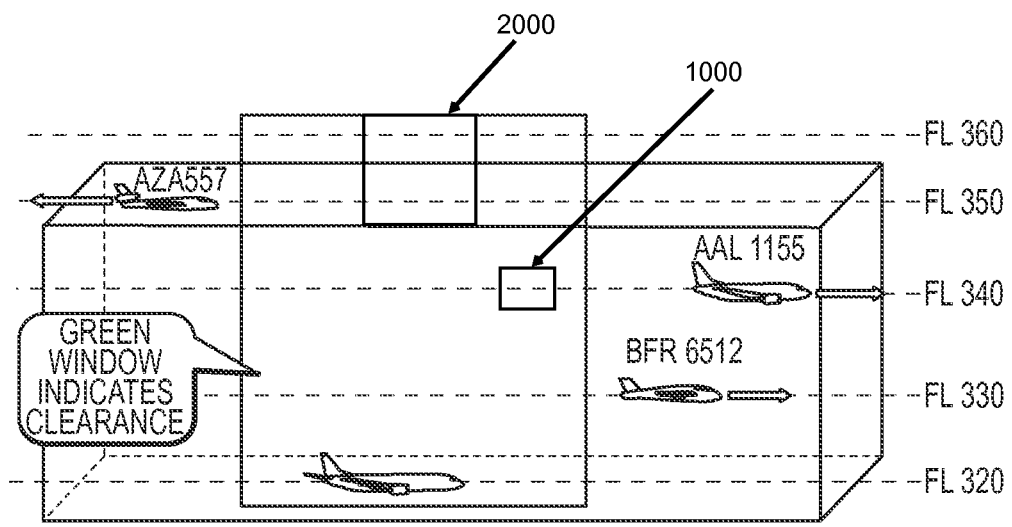

As illustrated in FIG. 1A, a pilot's own aircraft is shown at a bottom-most flight level. This flight level has been designated as "FL 320." There are also four additional flight levels shown, namely FL 330, FL 340, FL 350, and FL 360. The flight levels are illustrated as generally being separated equally. However, other separations of the flight levels are possible. For example, the flight levels can be displayed with a logarithmic or exponential scale. For example, many flight levels at an extreme edge of the display may be closely clustered together, whereas flight levels closer to the pilot's own aircraft may have greater separation from one another.

The pilot's own aircraft is illustrated with an icon of an aircraft in FIG. 1A. Other representations of an aircraft can also be used, including stick figure representations, or non-likeness representations, such as triangles, circles, or squares. If the system that provides the display is aware of the type of the aircraft, the system can display an icon corresponding to the type of the plane. For example, an icon can be different for a heavy aircraft as opposed to a general aviation aircraft, helicopter, space shuttle, or other flying object, such as a dirigible. It should be noted that an asymmetrical icon such those shown in FIG. 1A, can be used to indicate the heading of the aircraft. In FIG. 1A, all the aircraft are heading in the same direction.

The flight level is illustrated as a dashed line. The flight level can be indicated other ways as well. For example, the flight level can be indicated as a dotted line or solid line. The flight level can alternatively be indicated by a tick mark or similar mark on a vertical axis.

FIG. 1A illustrates a vertical region of interest shown with a box that appears to illustrate a volume. It is not necessary to include such a box. In FIG. 1A, the display of the aircraft is essentially a two-dimensional display, notwithstanding the box. In certain embodiments, however, bearing information regarding aircraft within the vertical region of interest can be displayed using a three-dimensional approach, in which a three-dimensional representation of the aircraft is used to show relative bearing within a volume of air. Additionally, if the system is aware that an aircraft being displayed is performing a horizontal maneuver, such as banking, the aircraft can be represented with an appropriate pitch.

The pilot's own aircraft and other aircraft can be differentiated in various ways. For example, the pilot's own aircraft can occupy a flight level that always the bottommost or always the middle flight level, or the flight level for the pilot's own aircraft may be indicated by a different line style from the other flight levels (for example, solid line as opposed to a dashed or dotted line). Alternatively, the pilot's own aircraft can be presented in a different color or shading from the color or shading of the other aircraft. In FIG. 1A, the pilot's own aircraft is not provided with a flight number indicator, and the other aircraft are provided with a flight number indicator, although in certain embodiments the flight number indicator of the pilot's own aircraft can be displayed.

Additional textual data about the aircraft in the display can be provided. The additional textual data can either always be displayed or can be toggled on and off by the pilot. For example, the display may be responsive to touch and may provide additional information about the other aircraft, including contact information for the other aircraft, upon touching the aircraft. Optionally, the display can further provide an option to tune a radio to allow the pilot to communicate with the other aircraft.

In FIG. 1A, there are three other aircraft shown in addition to the pilot's own aircraft. The number of aircraft, however, may vary depending on the circumstance. Additionally, FIG. 1A illustrates an aircraft in each one of the three flight levels above that of the pilot's own aircraft. There is not, however, any requirement that every flight level be occupied by an aircraft. In certain embodiments, a flight level that includes an aircraft can be given an expanded vertical spacing to permit display of the aircraft or of information related to the aircraft, whereas an unoccupied flight level may be shown in a relatively compressed view.

The aircraft at FL 350 has a long arrow pointing to the left. This may indicate that the speed of that aircraft is much less than the speed of the pilot's own aircraft. In certain embodiments, the length of the arrow can be related to the relative speed of the aircraft with respect to the pilot's own aircraft. The arrow can also be altered in color or shading to indicate a problematic relative speed difference. For example, if the speed difference is greater than 20 kts, the color of the arrow can change from green to red. Additionally, the length of the arrow can be such as to overlap with a clearance window, illustrating either that the speed of the aircraft is already a problem for the clearance window or soon may become a problem for the clearance window.

The aircraft at FL 340 has a shorter arrow pointing to the right. This may be because the aircraft at FL 340 has a slightly faster speed than the pilot's own aircraft. However, the aircraft at FL 340 is closer to the clearance window and consequently its arrow also overlaps into the clearance window shown.

The aircraft at FL 330 is shown without any arrow. This may be because the aircraft at FL 330 has a speed approximately the same as the pilot's own aircraft. The speed may be considered approximately the same when the difference in speed is below some threshold, such as 1 kt or 5 kts.

As shown in FIG. 1A, the clearance window can be shown in dark shading or color or by other means such as light shading or color, when there is some obstacle to performing a vertical maneuver. In FIG. 1A, the pilot's own flight level is included within the clearance window, although this is not necessary. The window in FIG. 1A has been selected to illustrate 15 nautical miles separation. It should be noted that the aircraft icon in FIG. 1A is not shown to scale with respect to the clearance window. Thus, although there may be 15 nm shown in each direction from the nose of the aircraft icon, it looks as though there is much more spacing in front of the aircraft than behind the aircraft. This appearance can be altered by centering the icon on the center point of the window, rather than placing the nose of the icon on the center point of the window.

In certain embodiments, the pilot may be able to select the position of the displayed clearance window with respect to the pilot's own aircraft. Thus, the pilot's own aircraft may be shown at the rightmost or leftmost edge of the display. Alternatively, the left or right edge of the clearance window may be shown at the right or left edge of the display.

In FIG. 1A, it should be noted that the clearance window is only shown with respect to blocked flight levels, and does not extend to FL 360. This may be because FL 360 is not blocked. Alternatively, the pilot may select how many flight levels should be addressed by the clearance window, and FL 360 may not be included in the selection (if, for example, the selection was three flight levels above the pilot's own aircraft).

FIG. 1A does not explicitly indicate the number of nautical miles in the horizontal direction. Such an indication can be provided in various ways. For example, vertical lines (solid, dashed, or dotted) can run the entire height of the display. Alternative, tick marks on a horizontal axis can be used to indicate nautical miles. For example, one tick mark can be placed every five nautical miles. Tick marks on the horizontal axis can also be used to indicate a clearance window. If tick marks are used to indicate nautical miles, the tick marks for a clearance window can differ from those for indicating nautical miles. For example, the tick marks for the clearance window can be longer than those for nautical miles.

In FIG. 1B, the clearance window extends all the way to the top flight level. In this case, the clearance window indicates that vertical maneuvers are unobstructed. In certain embodiments, the clearance window is only displayed when there are known obstructions. However, in this instance, the clearance window is shown and indicated as being clear from known obstructions. This "clear" status of the window can be variously indicated. For example, a "clear" window may have a shading or coloring different from an "obstructed" window. Alternatively, text such as "clear" and "obstructed" can be used as a tag for the clearance window to indicate whether the window is clear or obstructed.

In FIG. 1B, the same aircraft are shown as in FIG. 1A, but at a different time. At the time shown FIG. 1B, the aircraft at FL 350 is outside the clearance window, and its relative speed shows that it is apparently not going to enter the clearance window, because the arrow showing the relative speed of the aircraft extends away from the clearance window.

Likewise, the aircraft at FL 340 is well outside the clearance window, and its arrow shows that its relative speed is apparently going to move it even farther from the clearance window. Similarly, the aircraft at FL 330 is outside the clearance window and appears, based on its arrow, to be moving farther away from the clearance window. Such information may be useful to a pilot who plans both to perform a vertical maneuver and to increase speed after making the maneuver. Accordingly, a pilot may wish to increase to FL 350 rather than FL 330 or FL 340, because the pilot will have more room for acceleration at FL 350.

Also shown in FIG. 1B is an exemplary wake vortex indicator 1000 which may comprise a window and an exemplary turbulence or storm indicator 2000 which may also comprises a window. Wake vortex indicator 1000 may interact with a clearance window to provide a combined window or alternatively may be provided as an independent window. Similarly, the turbulence or storm indicator 2000 may interact with a clearance window to provide a combined window or alternatively may be provided as an independent window. Such wake vortex indicators 1000 or turbulence or storm indicators 2000 (or variations thereof) may be employed with any other embodiment of the present invention.

Figure 2:
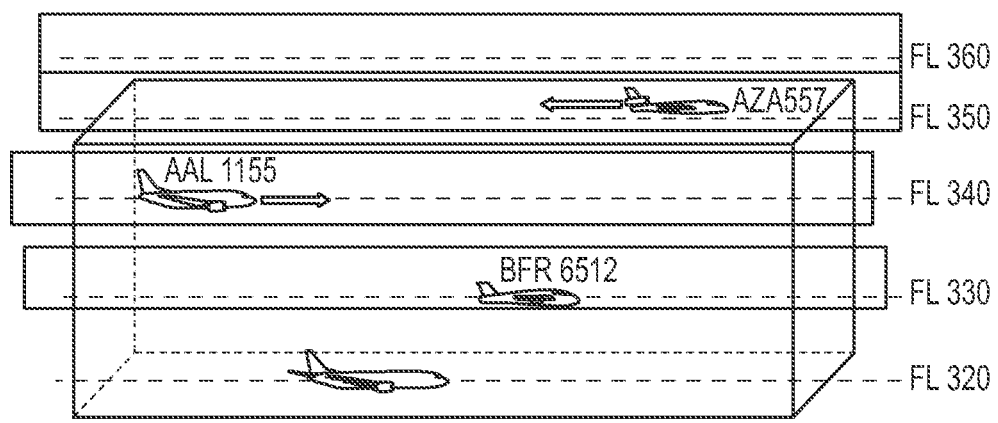
FIG. 2 also illustrates an embodiment of a vertical profile in accordance with certain embodiments of the present invention.

FIG. 2 also illustrates an embodiment of a vertical profile in accordance with certain embodiments of the present invention. As illustrated in FIG. 2, the pilot's own aircraft may be shown at the bottom-most flight level, as in FIGS. 1A and 1B. Unlike FIGS. 1A and 1B, the clearance window may not include the aircraft's own flight level. Additionally, the clearance window can be segmented into a plurality of bars. Thus, rather than the clear window extending over multiple flight levels as a single window, the clearance window extends over each flight level as a segment. When a particular flight level is obstructed, an indication of that obstruction can be displayed to the pilot by a color, shading, textual, or other indication connected to the window. The other indication may be, for example, a blinking or color inversion of the window.

As shown in FIG. 2, the clearance window can occupy the entirety or almost the entirety of the display. The clearance window can also contain multiple layers. Thus, for example, a window can be formed around a particular aircraft, showing the area that that aircraft is blocking, both within and outside the pilot's own clearance window. This secondary layer can be combined with the clearance window to form a single shape, or can be displayed as an overlay, such as by using a secondary shading or coloring.

Additional features for the displays are also possible. Some of those additional features are discussed below with reference to methods according to certain embodiments of the present invention. It should be understood that these features may be practiced in combination or in isolation, and that additional features can also be added.

Figure 3:
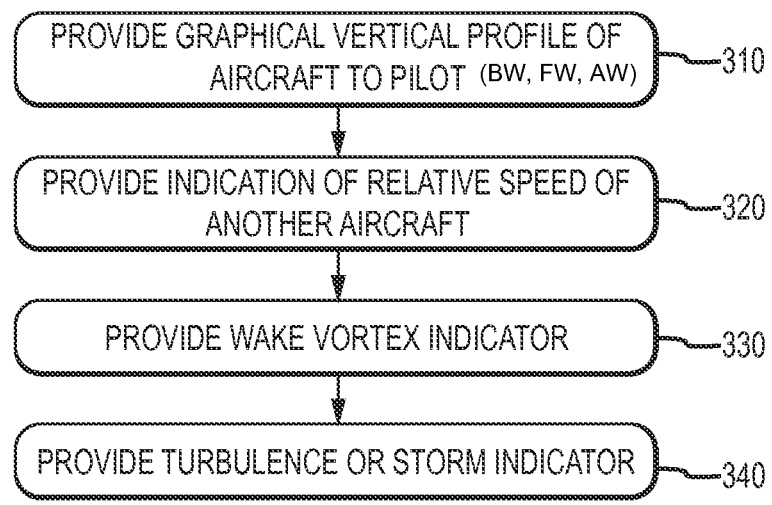
FIG. 3 illustrates a method according to certain embodiments of the present invention.

FIG. 3 illustrates a method according to certain embodiments of the present invention. As illustrated in FIG. 3, the method can include, at 310, providing, in a hardware display, a graphical vertical profile displaying an aircraft to a pilot of the aircraft. As represented in FIG. 3, the providing in the hardware display of the graphical vertical profile may permit the user to select from one of a number of different view types including, without limitation, a balanced window view, a forward-looking only window view or an aft-looking only window view (i.e., BW, FW or AW).

The clearance window can have a shading or coloring indication to indicate an obstacle to performing a vertical maneuver. The clearance window can be configured to provide a visual and/or aural indicator of change in status with respect to vertical maneuver prohibition or permission. For example, the visual indicator of status can be that a warning against a vertical procedure is provided in an amber color.

The clearance window can be segmented to provide individual warnings for each flight level. The clearance window can likewise be segmented to provide individual indications of clearance for each flight level.

The clearance window is configured to display a full range of possible altitudes for the aircraft. In other words, the clearance window may indicate clearance status for a number of flight levels both above and below the aircraft. The exact number of flight levels to be displayed may depend on the capabilities of the aircraft. In certain embodiments, the number of flight levels may be from two to five. Alternatively, the clearance window can be configured to display altitudes only at and above the altitude of the aircraft of the pilot. Such implementations may be used by a pilot whose only interest is in ascending. Contrariwise, the clearance window can be configured to display altitudes only at and below the pilot's own aircraft. The clearance window can be configured to display less than five flight levels above or below a current flight level of the aircraft of the pilot. In another embodiment, the pilot's own flight level may be omitted. The display window itself can be similarly configured to the clearance window, or can contain additional flight levels.

The hardware display can be configured to permit reselection of the display of the aircraft of the pilot from a lowest flight level displayed to a middle flight level displayed or a top flight level displayed. The hardware display can be configured to permit reselection of the display from a balanced window to a forward-looking only window or an aft-looking only window. The hardware display can be configured to permit reselection of the display from a balanced window to a forward-looking only window or an aft-looking only window.

In certain embodiments, only aircraft for which ADS-B information is available are displayed. In other embodiments, the other aircraft or additional aircraft are displayed despite an absence of ADS-B information for that aircraft.

The method can also include, at 320, providing, in the vertical profile, an indication of the relative speed of at least one other aircraft and a graphical indication of a clearance window for vertical maneuvers for the aircraft of the pilot.

The indication of the relative speed comprises a graphical indication of the relative speed. The graphical indication may be, for example, an arrow that has a length proportionate to speed. The proportionality can be linear or otherwise. For example, the length of the arrow can be exponentially related to the relative speed. Below a certain threshold, the graphical indication of relative speed can be omitted. The graphical indication of the relative speed and the graphical indication of the clearance window can be configured to overlap according to a projected clearance condition.

The method can further include, at 330, providing a wake vortex indicator. The wake vortex indicator can take the form of a window in which a wake vortex is expected, or simply a flag to indicate the possibility of a wake vortex. The wake vortex window can be configured to interact with the clearance window to provide a combined window. Thus, the wake vortex window can be combined with the clearance window or may overlay it. The size of a wake vortex window may be calculated based on a variety of factors including an aircraft model (for example, Boeing 777) or category (for example, widebody jetliner or general aviation), speed of the aircraft, and wind conditions.

The method can additionally include, at 340, providing a turbulence or storm indicator. In addition to displaying aircraft, in certain embodiments the display may also provide an indication (in amber, for example) that a flight level may be subject to high turbulence or a storm. The turbulence or storm indicator may include a window. The turbulence or storm window can be configured to interact with the clearance window to provide a combined window. The turbulence of storm indicator can be provided via a weather service system or may be information provided by other aircraft in the area.

The various methods set forth above can be variously implemented. For example, the methods can be implemented in hardware or a combination of hardware and software. For example, a computer readable medium can be encoded with instructions that, when executed in hardware, perform a process such as one of the methods set forth above.

Figure 4:
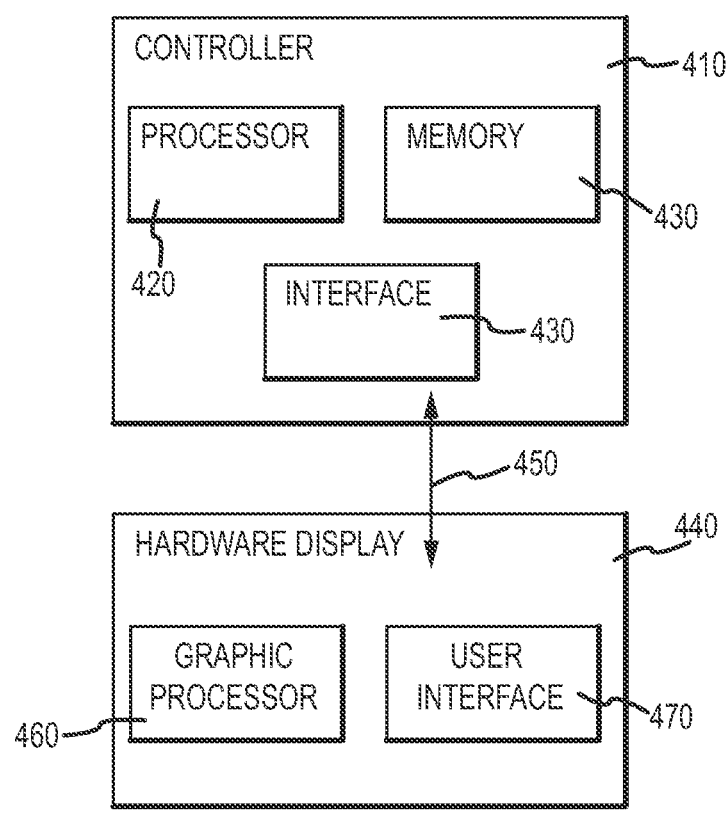
FIG. 4 illustrates a system according to certain embodiments of the present invention.

FIG. 4 illustrates a system according to certain embodiments of the present invention. As shown in FIG. 4, a system can include a controller 410 that includes at least one processor 420 and at least one memory 430. The controller 410 can also include at least one interface 430, for allowing the controller 410 to communicate with avionics and other systems in an aircraft (not shown).

The system can also include a hardware display 440. The hardware display 440 may be connected (either directly or indirectly) to the controller 410 via communication link 450. This communication link 450 may be wireless or wired.

The hardware display 440 can include a graphics processor 460 and a user interface 470. The graphics 460 may be any suitable graphics device configured to receive inputs from the controller and provide a graphical display on the user interface 470. The user interface 470 can be provided in various ways. For example, the user interface 470 can be a heads up display, a flat panel display, or a cathode ray tube display. The user interface 470 can incorporate a touch screen and haptic feedback to permit a pilot to operate the user interface 470 by touching a display. The user interface 470 can additionally include knobs, one or more keys, toggles, and other user input devices, such as a trackball.

Although the controller 410 and the hardware display 440 are illustrated as separate units, they can be combined into a single box. Moreover, there is no requirement that the processor 420 and the graphics processor 460 be separate devices.

The memory 430 of the controller 410 can be any suitable storage device or non-transitory medium. For example, the memory 430 can be RAM or ROM. The memory 430 can be on the same chip as that of the processor 420. This system can be installed in the cockpit area of an aircraft and can be configured to run on power supplied by the aircraft. This system can also be configured to obtain information from other systems of the aircraft via the interface(s) 430.

The system of FIG. 4 can be configured to perform any of the methods described above. For example, the system of FIG. 4 can be configured to perform the method illustrated in FIG. 3.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
providing, by a computer processor, in a hardware display, a graphical vertical profile displaying an aircraft to a pilot of the aircraft; and
providing, by the computer processor, in the vertical profile, dedicated and simultaneous indications of a relative speed of and for every other aircraft shown in the vertical profile when a plurality of other aircraft are shown and only a single graphical indication of a clearance window for vertical maneuvers for the aircraft of the pilot, the clearance window provided as a single contiguous area circumscribing a subset portion of the vertical profile, even when more than two flight levels are shown; wherein:
the clearance window, when displayed within the displayed vertical profile, further comprises one of:
a single visual indication that spans all flight levels that are obstructed according to predefined flight rules when a plurality of flight levels are obstructed, and
a single visual indication that spans all allowable flight levels according to the predefined flight rules.

2. The method of claim 1, wherein the clearance window has a shading or coloring indication to indicate an obstacle to performing a vertical maneuver.

3. The method of claim 1, wherein the clearance window is configured to provide a visual and/or aural indicator of change in status with respect to vertical maneuver prohibition or permission.

4. The method of claim 3, wherein the visual indicator of status is that a warning against a vertical procedure is provided in an amber color.

5. The method of claim 1, wherein the clearance window is segmented to provide individual warnings for each flight level.

6. The method of claim 1, wherein the clearance window is configured to display a full range of possible altitudes for the aircraft of the pilot.

7. The method of claim 1, wherein the clearance window is configured to display altitudes only at and above the altitude of the aircraft of the pilot.

8. The method of claim 1, wherein the clearance window is configured to display less than five flight levels above or below a current flight level of the aircraft of the pilot.

9. The method of claim 1, wherein the hardware display is configured to permit reselection of the display of the aircraft of the pilot from a lowest flight level displayed to a middle flight level displayed or a top flight level displayed.

10. The method of claim 1, wherein the hardware display is configured to permit reselection of the display from a balanced window to a forward-looking only window or an aft-looking only window.

11. The method of claim 1, wherein the indication of the relative speed comprises a graphical indication of the relative speed.

12. The method of claim 11, wherein the graphical indication of the relative speed and the graphical indication of the clearance window are configured to overlap according to a projected clearance condition.

13. The method of claim 1, further comprising:
providing a wake vortex indicator.

14. The method of claim 13, wherein the wake vortex indicator comprises a window.

15. The method of claim 13, wherein the wake vortex window is configured to interact with the clearance window to provide a combined window.

16. The method of claim 1, further comprising:
providing a turbulence or storm indicator.

17. The method of claim 16, wherein the turbulence or storm indicator comprises a window.

18. The method of claim 16, wherein the turbulence or storm window is configured to interact with the clearance window to provide a combined window.

19. The method of claim 1, wherein at least one additional aircraft is displayed despite an absence of ADS-B information.

20. A non-transitory computer readable medium encoded with instructions that, when executed in hardware, perform a process, the process comprising:
providing, in a hardware display, a graphical vertical profile displaying an aircraft to a pilot of the aircraft; and
providing, in the vertical profile, dedicated and simultaneous indications of a relative speed of and for every other aircraft shown in the vertical profile when a plurality of other aircraft are shown and a single graphical indication of a clearance window for vertical maneuvers for the aircraft of the pilot, the clearance window provided as a single contiguous area circumscribing a subset portion of the vertical profile, even when more than two flight levels are shown, wherein:
the clearance window, when displayed within the displayed vertical profile, further comprises one of:
a single visual indication that spans all flight levels that are obstructed according to predefined flight rules when a plurality of flight levels are obstructed, and
a single visual indication that spans all allowable flight levels according to the predefined flight rules.

21. The computer readable medium of claim 20, wherein the indication of the relative speed comprises a graphical indication of the relative speed.

22. A system, comprising:
at least one processor; and
at least one memory encoded with computer instructions, wherein the at least one processor and at least one memory are configured to cause the system at least to
provide, in a hardware display, a graphical vertical profile displaying an aircraft to a pilot of the aircraft; and
provide, in the vertical profile, dedicated and simultaneous indications of a relative speed of and for every other aircraft shown in the vertical profile when a plurality of other aircraft are shown and only single graphical indication of a clearance window for vertical maneuvers for the aircraft of the pilot, the clearance window provided as a single contiguous area circumscribing a subset portion of the vertical profile, even when more than two flight levels are shown, wherein:
the clearance window, when displayed within the displayed vertical profile, further comprises one of:
a single visual indication that spans all flight levels that are obstructed according to predefined flight rules when a plurality of flight levels are obstructed, and
a single visual indication that spans all allowable flight levels according to the predefined flight rules.

23. The system of claim 22, wherein the indication of the relative speed comprises a graphical indication of the relative speed.

* * * * *